Sept. 21, 1954 K. LEHOVEC 2,689,876
SOLID ION ELECTROLYTE BATTERY
Filed June 19, 1953
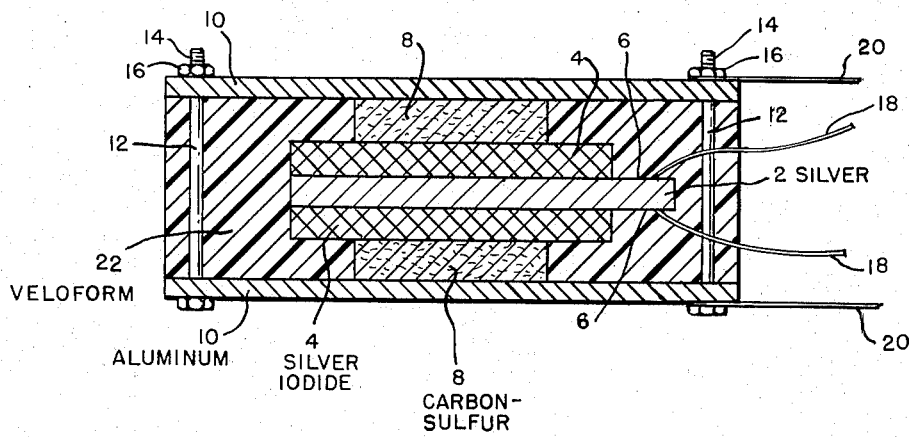
INVENTOR
BY KURT LEHOVEC
ATTORNEY Patented Sept. 21, 1954

2,689,876

UNITED STATES PATENT OFFICE 2,689,876

SOLID ION ELECTROLYTE BATTERY

Kurt Lehovec, South Williamstown, Mass., assignor to the United States of America as represented by the Secretary of the Army Application June 19, 1953, Serial No. 362,976

6 Claims. (Cl. 136—100)

(Granted under Title 35, U. S. Code (1952), sec. 266)

The invention described herein may be manufactured and used by or for the Government for governmental purposes, without the payment of any royalty thereon.

The present invention relates to batteries and more particularly to primary cells consisting entirely of solid components. An application by Jacob D. Broder entitled "Solid Ion Electrolyte Battery," S. N. 359,672, filed June 4, 1953, is an improvement on the present invention.

In the conventional dry battery such as the Leclanché cell, electronic conduction occurs only in the external circuit. The electrons cannot pass through the aqueous electrolyte since the latter, according to Faraday's law, is a near perfect insulator. The electrolyte, therefore, must be present to prevent internal shorts in the battery thereby insuring the passage of electrons only in the external circuit. The necessity for the presence of the aqueous solution results in strictly limiting any possibilities of miniaturization of such batteries so that in those situations where extremely small size is desired, the use of a conventional dry battery presents a definite disadvantage.

Accordingly, it is a primary object of the present invention to provide a battery having a solid ion electrolyte which is very nearly a complete electronic insulator.

It is a further object to provide a battery which is capable of extreme miniaturization.

In accordance with the present invention, there is provided a battery comprising a negative electrode, a positive electrode comprising a substance reducible by the negative electrode and a solid ion electrolyte between and in contact with the electrodes.

For a better understanding of the invention together with other and further objects thereof, reference is had to the following description taken in connection with the accompanying drawing and its scope will be pointed out in the appended claims.

It has been found that certain salts are near perfect electronic insulators. The silver halides are examples of such compounds, all being good ionic conductors and showing little or no electronic conductivity. Accordingly, a system analogous to the Leclanché cell, wherein a solid ion electrolyte which is a near perfect insulator can be utilized to replace the aqueous electrolyte, generates an E. M. F.

The progress of the chemical reaction $$A + B \rightarrow AB$$

necessitates the transport of A or B or both through the reaction product AB. This transport usually takes place in the formation of ions and electrons. Thus, if the transport of electrons is impossible, the reaction cannot proceed. However, if A and B are connected in an external circuit, electrons transfer therethrough and the reaction will continue.

A preferred embodiment of the present invention is a solid ion electrolyte battery comprising the system Ag/AgI/S. The silver is the negative electrode and provides electrons and silver ions. Sulfur is the positive electrode to which the electrons flow, and in the chemical reaction, the sulfur is reduced to the divalent sulfide ion in accordance with the following reactions $$2Ag \rightarrow 2Ag^+ + 2e \quad (1)$$
$$S + 2e \rightarrow S^= \quad (2)$$

The additions of Reactions 1 and 2 may be expressed as $$2Ag + S \rightarrow Ag_2S \quad (3)$$

When the positive and negative electrodes are connected in an external circuit, the silver ions can leave the silver electrode by diffusing through the interstices of the crystal lattice of the silver iodide electrolyte and the electrons can move through the external circuit to the sulfur permitting the reduction of the sulfur. In effect, therefore, the system described can be symbolized more completely as Ag/AgI/Ag$_2$S/S.

Referring now to the drawing, there is depicted a preferred embodiment of the present invention. A sheet of silver 2 has on each surface thereof a silver iodide layer 4. The silver iodide layer does not cover the silver completely, the uncovered portions 6 serving as a point of attachment of lead wires to the silver electrode. In intimate contact with the silver iodide layers 4, are pellets 8 comprising a mixture of sulfur and carbon. The silver, silver iodide, sulfur-carbon arrangement is sandwiched together between aluminum plates 10 as shown and the entire assembly is held together by compression posts such as at 12, each post being threaded at one end 14 to receive nuts 16 which serve to tighten the assembly and to insure close contact between all the elements of the system. Lead wires 18 from the negative electrode, silver 2 and lead wires 20 from the positive electrode sulfur-carbon 8 are provided for electrical connection in an external circuit. It is to be understood that the lead wire 20 from the positive electrode may be attached directly to the aluminum plates 10 since aluminum is a good conductor and the electric circuit is readily completed therethrough from the silver to the sulfur, a convenient point being at nut 16 as shown. The embodiment depicted in the drawing is essentially two parallel cells as a single cell would consist only of silver and one sulfur-carbon pellet in contact with a silver iodide layer therebetween.

To construct the hereinabove described embodiment, the silver sheet is first prepared by cleaning it in a suitable manner. The silver iodide layer is formed by heating a weighed amount of iodine with the cleaned silver sheet under vacuum conditions. In this manner, the thickness of the silver iodide layer is readily controlled and a layer of less than 1 mil thickness is easily achieved. After the silver iodide layer has been formed, a small portion is scraped from the silver and a wire lead is welded or soldered thereto.

The carbon-sulfur electrode may be prepared by any convenient method. It has been found that a preferred way is to mix sulfur and carbon, using approximately 15% sulfur and 85% carbon and pressing the mixture into pellet form at a pressure of about 100,000 lbs. per square inch. The silver-silver iodide sheet is placed between the two carbon-sulfur pellets and the resulting unit is placed between aluminum plates, the elements of the assembly being kept in intimate contact with each other by compression posts between the aluminum plates as described supra. In order to protect the exposed silver from sulfidizing, the whole unit is immersed in a suitable plastic material 22 such as veloform and permitted to harden.

As an example of the present invention, a battery having a silver sheet about 2.5 square cms. in area, carbon pellets of about ½ inch in diameter, aluminum plates 1½ inches square, and silver iodide layers of approximately 1 mil thickness gives an open circuit voltage of about 0.2 volt and a short circuit current of about 0.22 amp. per square centimeter for a single cell.

It can readily be seen from the dimensions of the components set forth that by using a solid ion electrolyte, appreciable voltages and currents may be obtained from a solid ion electrolyte battery making it extremely useful where the size of the battery is an important factor.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed:

1. A primary cell including a negative electrode, a positive electrode comprising a substance reducible by said negative electrode and a solid crystalline electrolyte between and in contact with said electrodes.

2. A primary cell including a metal negative electrode, a positive electrode comprising a material reducible by said metal and a solid crystalline electrolyte between and in contact with said electrodes.

3. A primary cell including a negative electrode comprising silver, a positive electrode comprising a material reducible by said silver and a solid crystalline electrolyte between and in contact with said electrodes.

4. A primary cell including a negative electrode comprising silver, a positive electrode comprising sulfur intimately mixed with carbon and a solid ion electrolyte between and in contact with said electrodes.

5. A primary cell including a negative electrode comprising silver, a positive electrode comprising an intimate mixture of sulfur and carbon and a solid ion electrolyte between and in contact with said electrodes comprising a silver halide.

6. A primary cell including a negative electrode comprising silver, a positive electrode comprising an intimate mixture of sulfur and carbon and a solid ion electrolyte between and in contact with said electrodes comprising silver iodide.

References Cited in the file of this patent

UNITED STATES PATENTS

| Number | Name | Date |
|---|---|---|
| 1,662,866 | Salazar | Mar. 20, 1927 |
| 2,445,306 | Lawson | July 13, 1948 |
| 2,566,114 | Bloch | Aug. 28, 1951 |
| 2,607,809 | Pitzer | Aug. 19, 1952 |

FOREIGN PATENTS

| Number | Country | Date |
|---|---|---|
| 449,687 | Great Britain | July 1, 1936 |